United States Patent [19] [11] 3,707,783
Hajduk [45] Jan. 2, 1973

[54] TEACHING MACHINE
[76] Inventor: Marian S. Hajduk, 150-48 29th Avenue, Flushing, N.Y. 11354
[22] Filed: April 12, 1971
[21] Appl. No.: 133,302

[52] U.S. Cl. .................................35/31 R, 235/168
[51] Int. Cl. ...........................................G09b 19/02
[58] Field of Search ...............35/30, 31 R, 31 C, 32; 235/168

[56] References Cited

UNITED STATES PATENTS 3,587,093   6/1971   Paulsen ..................................35/30 X Primary Examiner—Wm. H. Grieb
Attorney—Peter L. Tailer

[57] ABSTRACT

A teaching machine, on a given number of depressions of a first button, which makes a distinct sound with each depression, lights that number of lamps in a first 3 by 3 matrix in a given order to show the groups of 1's, 2's, and/or 3's which make up that given number. A second button, on each depression, unlights a single lamp to show subtraction. A second 3 by 3 matrix of lamps has one lamp light after all lamps are lit in the first matrix on depression of the first button which then turns off the bulbs of the first matrix. This second matrix shows the decimal concept of number from ten up. Numerical indicators show the numbers represented. Arrows pointing between the matrixes show the addition of nine plus one moving from the first units matrix to the second tens matrix or the subtraction of ten minus one moving from the second tens matrix to the first units matrix. A square overlay divided into three zones is placed over at least the first units matrix with the zones in a horizontal or a vertical position to selectively indicate different groupings of lamps making up a given indicated number.

Specific circuitry is used so that each additional lamp in a matrix which is lit lights all the other required bulbs to indicate a given number.

22 Claims, 5 Drawing Figures

INVENTOR.
MARIAN S. HAJDUK

INVENTOR.
MARIAN S. HAJDUK

TEACHING MACHINE

BACKGROUND OF THE INVENTION

A new method in teaching arithmetic places emphasis on developing meaning and understanding of the basic concepts of the whole numbers and of the algorism we employ. Arithmetic must be made meaningful to the child and this calls for association of each concept with concrete numbers. Multisensory aids facilitate the learning experience, e.g., learning of the idea of the number two is eased if the child sees two elements, makes two moves, hears two signals and sees the symbol "2," all at the same time.

Present arithmetic teaching aids do not use the multisensory principle of operation. They are also, most of the time, only of the visual type, and the operations to be performed are readily predetermined, so that they do not answer the child's problems, but merely check his knowledge of the algorisms. This does not satisfy the modern arithmetic teaching method where the child learns through his own independent experience.

SUMMARY OF THE INVENTION

This invention provides an inexpensive and flexible arithmetic teaching device by using a number volume decoder and a number volume display. It operates as follows: Each activation of a counting button, located with all displays on a front panel of the teaching machine, causes an audio sound and changes the number stored with a decimal up/down counter by one. A numerical display associated with the up/down counter indicates the new number stored within the up/down counter (in a numerical form), while the number volume decoder causes the number volume display to light elements in a number equivalent to the number stored within the up/down counter and as indicated by the numerical display. This way the child sees a direct relation between the amount of count switch activations, the amount of sounds, the amount of the lit lamps within the number volume display and the digital number as displayed on the numerical display. An up/down switch controls the up/down counter and determines whether the number within the up/down counter is increased or decreased after each activation of the count switch. This way the addition and subtraction operations can be performed.

To better explain the meaning of the decimal places, the number volume display associated with the tens up/down counter has preferably different color lamps, from the number volume display associated with the units up/down counter. This way the child learns easier that one lit lamp in a given color is equivalent to ten lit lamps in the other one.

Thus it may be seen that a main object of the invention is to provide a physical interpretation of number concept and of arithmetical algorisms. The number concept is taught by the display of lamps lit in a 3 by 3 units matrix and a 3 by 3 tens matrix. A rectangular cover divided into zones is placed over each matrix. Rotation of the rectangular cover to orient the zones either horizontally or vertically selectively indicates different groupings of lamps making up a given indicated number.

DESCRIPTION OF THE PREFERRED EMBODIMENT

Figure 1:
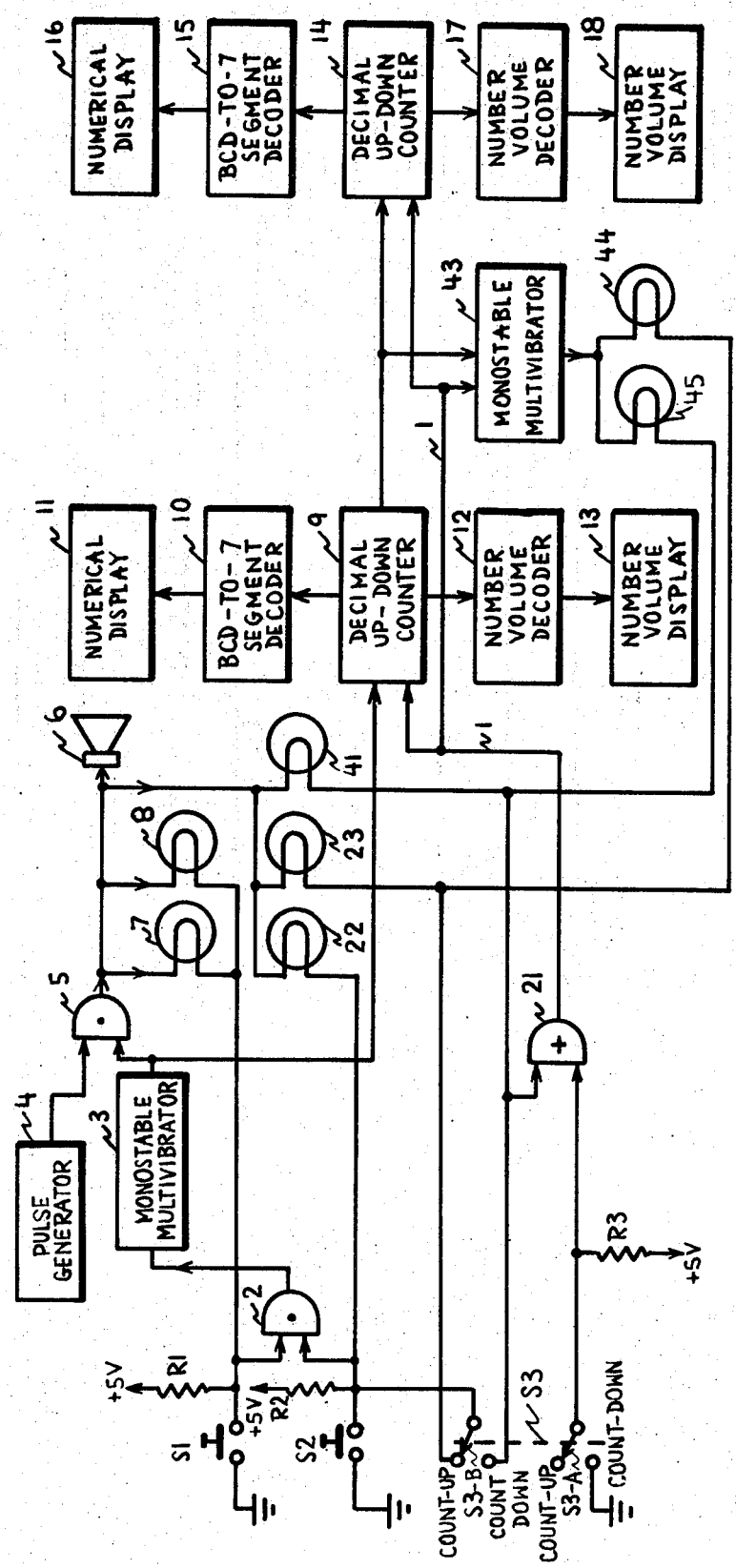
FIG. 1 is a block diagram illustrating the electronic circuitry of my teaching machine.

Referring now to the FIG. 1, there is shown a preferred electronic embodiment of the invention. Closing of the switch S1 causes the output signal of the AND gate 2 to go low; this in turn triggers the monostable multivibrator 3, which produces a pulse, preferably of one-half second in width. The multivibrator 3 output signal is a positive going pulse which enables AND gate 5. The other input signal into gate 5 is from pulse generator 4. The pulse generator 4 is preferably built around a unijunction transistor. Its output frequency must be in audio range and is preferably around 1 kHz. The output signal of the AND gate 5 drives the loudspeaker 6, which provides an acoustical signal of predetermined duration and frequency.

Figure 3:
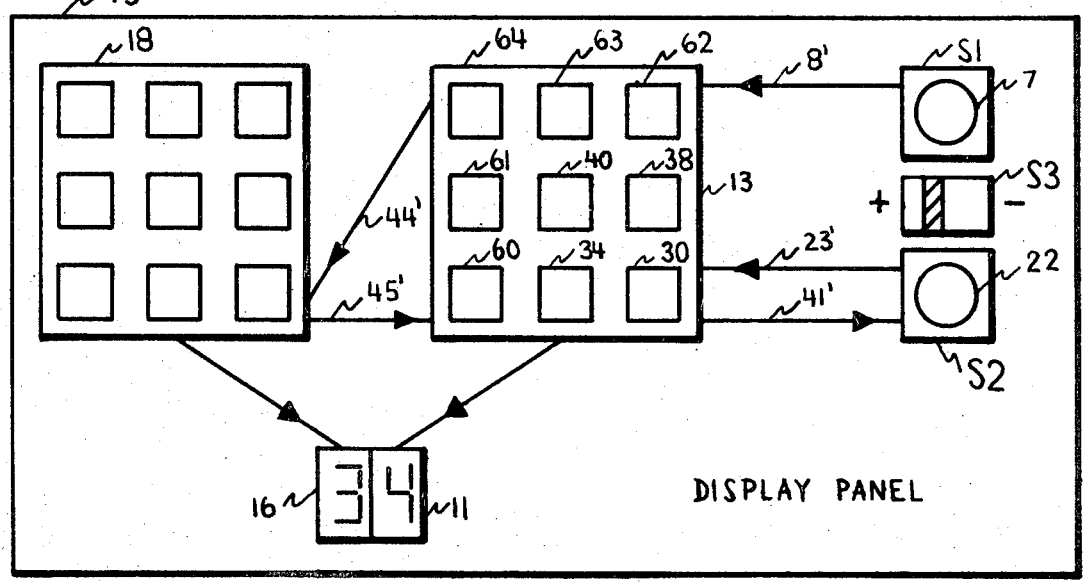
FIG. 3 shows a preferred arrangement of the front panel of the teaching machine.

The output signal of the gate 5 is also used to drive the lamp 7 located within the switch S1 and to drive the lamp 8, which illuminates the transparent arrow 8' shown in the FIG. 3. The output signal from the multivibrator 3 clocks an up/down counter 9 increasing the number stored therein by one. The counter 9, which may be a decimal up/down counter, stores units. After receiving 10 pulses, the counter 9 overflows and clocks another decimal or other up/down counter 14, the content of which represents tens. The counters 9 and 14 can be of the type 8285 which is manufactured by Signetics. The number stored in counters 9 and 14 correspond to the amount of switch S1 activations. This number is decoded by the associated display decoders 10 and 15 and displayed on associated numerical displays 11 and 16 in the form of a number. The displays 11 and 16 are preferably of the type M-1, manufactured by Monsanto. The decoders 10 and 15 are preferably of the type SN7447 manufactured by Texas Instrument.

To have a qualitative meaning to a learning child, the number stored in the counters 9 and 14 must be shown in a volume type of display. This means that whenever the counters 9 and 14 contain number one, two or three, the associated number volume displays 13 and 18 must have one, two or three lit lamps, respectively.

Figure 2:
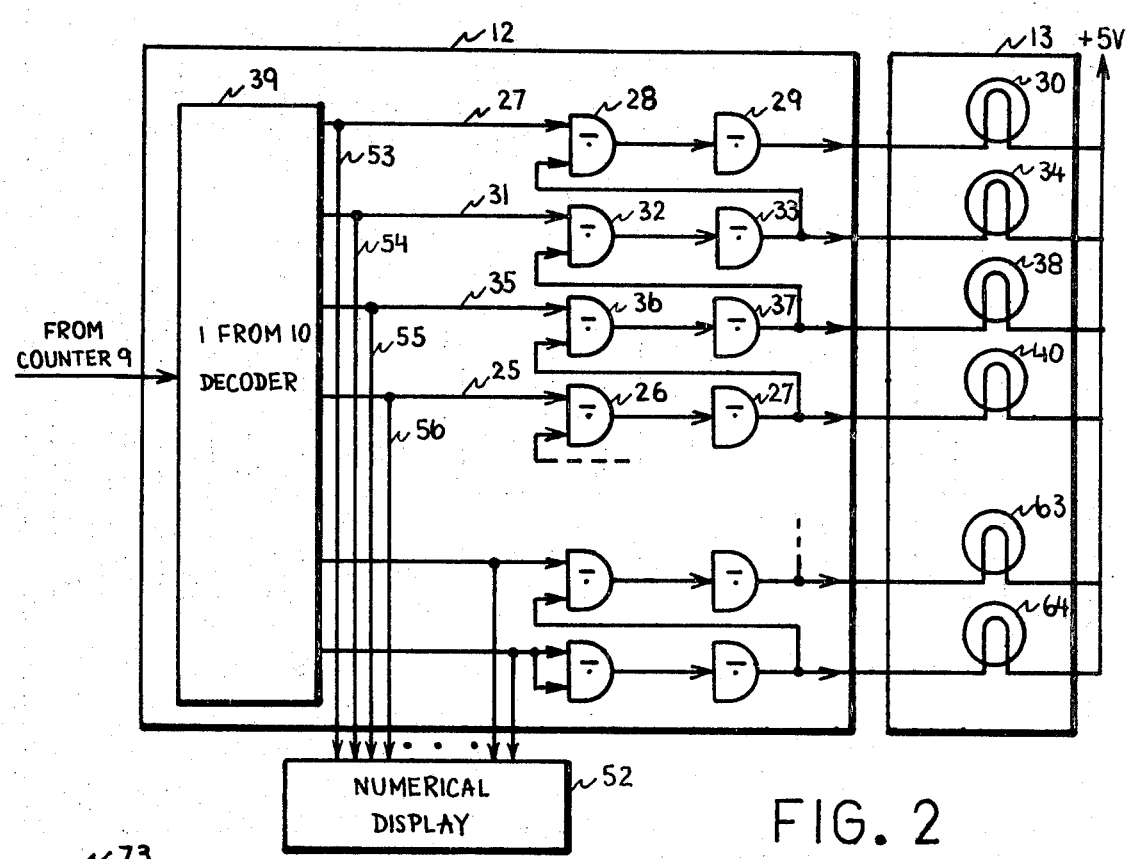
FIG. 2 is a schematic diagram illustrating a preferred embodiment of the number volume decoder shown in FIG. 1.

The operation of the number volume decoder can be explained fully by referring to FIG. 2.

The decoder 39 decodes binary coded decimal (BCD) outputs of the counter 9. The decoder 39 has ten output lines . . . each corresponding to one of ten possible states of the counter 9, zero through nine. The output corresponding to zero is not used and is not shown. The output lines corresponding to one through nine are designated by the reference numerals 27, 31, 35, 25 . . . The decoder 39 output line associated with the number stored in the counter 9 goes low and all other output lines remain high. If the number in the counter 9 is one, the associated signal line 27 goes low and sets the output of the NAND gate 28 high. This, in turn, sets the output of the NAND gate 29 low. One lead of lamp 30 is connected to plus 5 volts, the other lead of the lamp 30 is shorted to ground via the gate 29 output so that lamp 30 lights. If the number stored in the counter 9 is two, the line 31 goes low and sets the NAND gate 32 output high. This, in turn, sets the NAND gate 33 output low, returning the lamp 34 to ground so that the lamp 34 lights. The low gate 33 output sets gate 28 output high, which in turn sets gate 29 output low. This causes the lamp 30 to light also. Thus, whenever the number in the counter 9 is two, the lamps 34 and 30 light.

Whenever the number in the counter 9 is three the associated line 35 goes low and causes the lamp 38 to light by means of the NAND gates 36 and 37. The gate 37 output also lights lamps 34 and 30 in a manner described earlier. Similarly, whenever the number in the counter 9 is four, it will cause the lamps 40, 39, 34 and 30 to light. The operation of the number volume decoder 17 is identical to the operation of the decoder 12 and the operation of the display 18 is identical to the operation of the display 13. The decoder 39 is preferably of the type SN7442 manufactured by Texas Instruments, and the NAND gates within the decoder 12 are preferably of the type SN15857 manufactured by Texas Instruments.

In order to simulate addition and subtraction of two numbers, there is a second count switch S2 and an operation switch S3–A. The operation switch S3–A determines whether activations of the switch S2 will be added to the counter's 9 content or subtracted from it. Whenever switch S3–A is in the count up position, the OR gate 21 will receive on its input a high level via the resistor R3 and will provide a high output. This controls the counter 9 to count up. However, if the switch S3–A is in the count down position, the gate 21 output will go low, whenever the switch S2 is closed. Therefore, each activation of the switch S2 will control the counter 9 to count down and at the same time will produce a clock input to the counter 9 via the gate 2 and multivibrator 3. The lamp 22 is located within the switch S2 and lights for a limited duration of time, as determined by the output from the multivibrator 3.

The lamp 23 is lit when switch S3–B is set to the count up position and switch S2 is depressed. The lamp 41 is lit when the switch S3–B is set to the count down position and the switch S2 is depressed. The lamps 23 and 41 light for a limited amount of time as determined by the multivibrator's 3 output. The lamps 41 and 23 illuminate arrows 41' and 23' pointing towards and away from the switch S2, respectively, as shown in FIG. 3. The resistors R1, R2 and R3 provide positive bias for the gates 2 and 21. Their value is preferably around a few kohms.

Each overflow from the units counter 9 triggers the multivibrator 43 under control of the up/down signal passing through lead 1, the output of which is connected to the lamps 44 and 45. Whenever the switch S3–B is set to count up and the switch S2 is depressed, the lamp 44 lights for the duration of the output of the multivibrator 43. Similarly when the switch S3–B is set to count down and the switch S2 is depressed, the lamp 45 lights for the duration of the output of the multivibrator 43. The use of the lamps 44 and 45 is apparent by referring to FIG. 3. The lamp 44 lights transparent arrow 44' to indicate an overflow from units to tens and the lamp 45 lights transparent arrow 45' to indicate borrowing from tens.

Figure 4A:
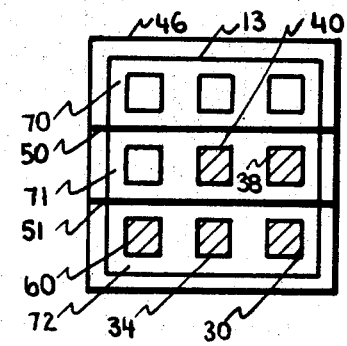
FIG. 4a shows a square indicator disposed over a 3 by 3 matrix of lamps with zones of the indicator in a horizontal position.
Figure 4B:
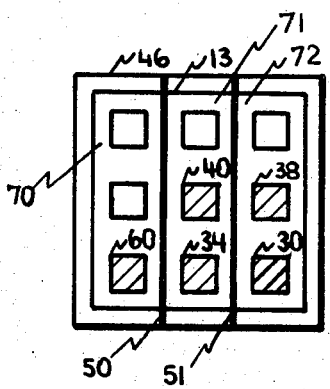
FIG. 4b shows the square indicator of FIG. 4a disposed over a matrix of 3 by 3 lamps with the indicator rotated through 90° placing the zones of the indicator in a vertical position.

Counting by twos, threes, etc., shortens the counting process and prepares the basis for understanding the multiplication and division processes. To separate the lamps within the number volume displays 13 and 18 into groups, an overlay or indicator 46 is employed. The overlay 46 is shown in FIG. 4a and FIG. 4b. The overlay 46 is made of transparent material in a form of a square with two separating lines 50 and 51 dividing the overlay into three zones, 70, 71 and 72. When the overlay 46 is placed over display 13 with the zones 70, 71 and 72 horizontal as shown in FIG. 4a, the lamps within this display will be separated into rows. If the number within the display 13 is five, there are five lit lamps 30, 38, 34, 40 and 60. These lit lamps 30, 38, 34, 40 and 60 are divided into groups of a three and a two in FIG. 4a in the zones 72 and 71 and into groups of two twos and a one in FIG. 4b in the zones 70, 71 and 72. This way, a number five can be thought of as composed of two twos and a one, or as a three and a two.

It is to be noted that, if the displays 16 and 11 are of the nixi type, decoders 10 and 15 are not required. Only the decoders 12 and 17 are required as the leads from each nixi display 52, as shown in FIG. 2, may be connected to a lead from decoder 39 to be driven directly. Thus leads 53, 54, 55, and 56 are connected, respectively, to leads 27, 31, 35, and 25.

It is further to be noted that the lamps of the number volume displays 13 and 18 light in a given order. Referring to number volume display 13 of FIG. 3, the lamps light in the following order: lamps 30, 34, 38, 40, 60, 61, 62, 63 and 64. This allows the overlay 46 to show the number three as groups of a two and a one, a four as groups of a two and a two, a five as groups of a three and a two or as groups of two two's and a one, a six as two groups of three's or three groups of two's, a seven as two groups of three's and a one or as groups of a three and two two's, eight as groups of two three's and a two, and nine as three groups of three's. Thus in the number volume displays, a corner lamp lights first, then the next lamp in a row, then the lamp next to the corner lamp in the same column, then the center lamp, then the last lamp in the same row as the corner lamp, then the last lamp in the center row, then the last three lamps in order in the last row.

While this invention has been shown and described in the best form known, it will nevertheless be understood that this is purely exemplary and the modifications may be made without departing from the spirit of the invention.

What is claimed is:

1. A teaching machine for the basic concepts of whole numbers comprising, in combination, a display panel, manually operated switch means, up-down counting means connected to said manually operated switch means, a number volume display on said display panel, said number volume display having nine lamps forming a three by three matrix, and number volume decoder means connected between the lamps of said display and said up-down counting means, said number volume decoder means successively lighting one of said lamps of said display on each activation of said manually operated switch means.

2. The combination according to claim 1 wherein said up-down counting means is an up-down counter and said manually operated switch means selectively controls said up-down counter to count up and down, said number volume decoder successively disconnecting a lit lamp on each activation of said manually operated switch means when said manually operated switch means controls said up-down counter to count down.

3. The combination according to claim 2 wherein said manually operated switch means includes a first button connected to said up-down counter, activation of said first button causing said up-down counter to count up, and a second button connected to said up-down counter, activation of said second button causing said up-down counter to count down.

4. The combination according to claim 3 wherein said buttons are on said display panel and with the addition of two arrows on said display panel, one of said arrows pointing from said first button to said display and the other of said arrows pointing from said display to said second button.

5. The combination according to claim 2 wherein said manually operated switch means includes a first button connected to said up-down counter, activation of said first button causing said up-down counter to count up, a second button connected to said up-down counter, and manually set count up-count down switch means connected to said up-down counter, said count up-count down switch means selectively resulting in activation of said second button causing said up-down counter to count up and to count down.

6. The combination according to claim 5 wherein said first and second buttons are on said display panel, and with the addition of three arrows on said display panel, a first arrow pointing from said first button to said display, a second arrow pointing from said second button to said display, and a third arrow pointing from said display to said second button.

7. The combination according to claim 6 wherein said arrows are transparent, and with the addition of means lighting said first arrow on each activation of said first button, means lighting said second arrow on each activation of said second button when said count-up-count down switch means has caused said up down counter to count up, and means lighting said third arrow on each activation of said second button when said count up-count down switch means has caused said up-down counter to count down.

8. The combination according to claim 2 wherein said matrix of lamps is in rows and columns, said lamps of said display being successively lit in the following order and being successively disconnected in the reverse order; a corner lamp, the adjacent lamp in the same row as the corner lamp, the adjacent lamp in the same column as the corner lamp, the center lamp of the matrix, the remaining lamp in the same row as the corner lamp, the remaining lamp in the center row of the matrix, and the first, second and third lamps of the remaining row.

9. The combination according to claim 8 wherein the corner lamp first lit is the lower right hand corner lamp of said matrix.

10. The combination according to claim 8 with the addition of a square overlay divided into three zones disposed over said display, said overly being selectively placed to have columns of lamps and rows of lamps show through said zones.

11. The combination according to claim 2 wherein said manually operated switch means includes a button and has a lamp and sound generating means associated therewith, each depression of said button lighting said lamp associated therewith and sounding said sound generating means.

12. The combination according to claim 11 with the addition of timing means connected between said button and said lamp associated therewith and said sound generating means, said timing means lighting said lamp and sounding said sound generating means for a given short time period.

13. The combination according to claim 12 wherein said timing means includes a monostable vibrator, said sound generating means being a speaker, said timing means lighting said lamp associated with said button and said monostable vibrator sounding said speaker for substantially one half second.

14. The combination according to claim 2 wherein said up-down counter is a first up-down counter, said display is a first display, and said number volume decoder means is a first number volume decoder means, and with the addition of a second up-down counter, a second number volume display on said display panel, and second number volume decoder means connecting said second display to said second up-down counter, said second up-down counter being connected to said first up-down counter to receive a single signal therefrom when said first up-down counter receives ten signals from said manually operated switch means.

15. The combination according to claim 14 wherein said second display is located to the left of said first display.

16. The combination according to claim 15 with the addition of first and second numerical display means, said first numerical display means being connected to said first up-down counter and said second numerical display means being connected to said second up-down counter, said numerical display means displaying on said display panel the number of signals received by each up-down counter.

17. The combination according to claim 16 with the addition of arrows on said display panel from said first display to said first numerical display means and from said second display to said second numerical display means.

18. The combination according to claim 15 with the addition of first and second arrows on said display panel, said first arrow leading from said first display to said second display indicating overflow from said first display to said second display, said second arrow leading from said second display to said first display indicating borrowing from said second display to said first display.

19. The combination according to claim 15 with the addition of first and second arrows on said display panel, said first arrow leading from the last row of lamps lit of said first display to the first lamp lit of said second display and said second arrow leading from the first lamp lit of said second display to the closest adjacent lamp of said first display.

20. The combination according to claim 18 with the addition of bulbs associated with said first arrow and with said second arrow, means lighting the bulb associated with said first arrow on operating said manually operated switch means each time said first up-down counter receives ten signals and sends a single signal to said second up-down counter, and means lighting the bulb associated with said second arrow on operating said manually operated switch means disconnecting a lit lamp when at least one lamp is lit in said second display and all lamps are disconnected in said first display.

21. The combination according to claim 2 wherein said up-down counter has binary outputs and wherein said number volume decoder means comprises a decoder from the binary coded decimal outputs, said decoder having nine output lines one of which carries a signal to indicate 1–9 or none of which carry a signal to indicate 0 corresponding to the number stored in the decimal up-down counter, a current source, nine sets of first and second gate means, each set being connected between a lamp of said display and one of said output lines, each of said first gate means, on receipt of a signal, activating the second gate means of that set to light a given lamp of said display, and connections from each second gate means to the first gate means of the preceding set so that a signal received by one set of said gate means activates all earlier sets of gate means to light all corresponding lamps of said display.

22. A teaching machine for the basic concepts of whole numbers comprising, in combination, a display panel, manually operated switch means, up-down counting means connected to said manually operated switch means, and a number volume display on said display panel, said number volume display having nine lamps forming a three by three matrix, said up-down counting means being connected to the lamps of said display to successively light one of said lamps of said display on each activation of said manually operated switch means.

* * * * *